Nov. 17, 1964    C. E. KARPPINEN    3,157,356
LIQUID LINE THERMOSTAT
Filed April 2, 1963
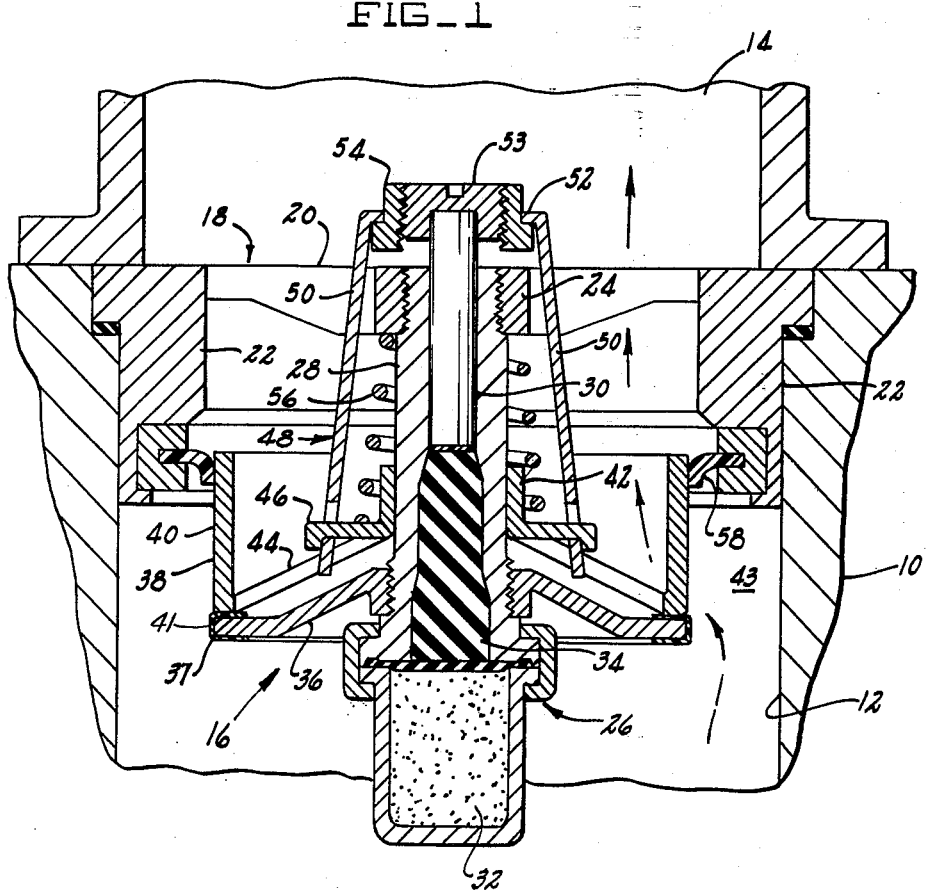
INVENTOR.
CHARLES E. KARPPINEN
BY
JOHN E. McRAE
ATTORNEY

United States Patent Office 3,157,356
Patented Nov. 17, 1964

3,157,356
LIQUID LINE THERMOSTAT
Charles E. Karppinen, Royal Oak, Mich., assignor to American Radiator & Standard Sanitary Corporation, New York, N.Y., a corporation of Delaware
Filed Apr. 2, 1963, Ser. No. 270,048
9 Claims. (Cl. 236—34)

This invention relates to liquid line thermostats such as are used for example in automotive cooling systems to regulate the flow of coolant between the engine coolant jacket and radiator. More specifically this invention is concerned with improvements in the type of thermostat which utilizes a tubular metering element arranged to present only a relatively small annular edge area to the upstream pressure, whereby the metering element is in a substantially balanced condition in all of its operating positions. This type of thermostat is now commonly referred to in the art as a balanced thermostat.

Primary objects of the present invention are to provide a balanced thermostat having detailed features of improvement as regards lowered manufacturing costs, satisfactory flow capacity, and improved service life. In attaining these objects I have designed the thermostat to include a tubular metering element and valve seat which can be manufactured as relatively low draft, low cost stampings. Additionally I have arranged the metering element and valve seat in a unique manner so that the metering element is adequately supported for precision slidable movement through a completely unobstructed annular flow space defined about the periphery of the valve seat.

Additional objects will appear from the following description and appended claims, reference being had to the accompanying drawings forming a part of this specification wherein like reference characters designate corresponding parts in the several views.

In the drawings:

FIGURE 1 is a sectional view taken through one embodiment of the invention; and

FIG. 2 is a sectional view taken on a reduced scale, and showing a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIG. 1 Construction

There is shown in FIG. 1 part of an engine head 10 having a coolant passage 12 for directing coolant from the engine into a line 14 leading to the conventional radiator, not shown. The coolant flow is regulated by the thermostat designated generally by numeral 16.

The thermostat includes a fixed support structure 18 which is made up of a spider 20 and an annular casing structure 22. The hub portion 24 of the spider is internally threaded to constitute a mount or anchor for the conventional thermostatic power element 26. As shown, the power element comprises a fixed housing structure 28 and a movable piston 30 arranged so that expansion of the thermal expansion material 32 in the lower portion of the housing structure results in upward bodily movement of rubber plug 34 and piston 30.

Under the present invention housing structure 28 has affixed thereto a disc-type valve seat 36 which preferably has a replaceable ring 37 of rubber, plastic or other sealing material slipped over its peripheral edge. Cooperating with the fixed valve seat is a tubular metering element 38 having an outer tubular portion 40 registering with sealing ring 37, an inner tubular portion 42 slidably-guidably encircling the housing structure 28, and a series of spokes 44 extending between the inner and outer tubular portions. Arm portions 46 are preferably struck out from the metering element material to form anchorages for the strap type piston connector means 48.

As illustrated in FIG. 1, connector means 48 comprises an annular web 52 and two apertured arm portions 50 which extend downwardly through spider 20 to connections with arms 46. Web 52 fits over a collar 54 which threads onto a calibration nut 53 resting atop piston 30. With the device properly calibrated, thermal expansion of material 32 results in movement of the metering element away from seat 36 whereby to permit flow of coolant from line 12 into line 14. In order to return the metering element toward seat 36, as on temperature decrease, there is provided a compression spring 56.

Undesired bypass of liquid around the external surface of element 38 is prevented by an annular flap type sealing element 58 which is suitably mounted in casing structure 22 so that its inner face area engages the side surface of the metering element. With the sealing element arranged as shown the upstream pressure acts to increase the force of engagement between the sealing element and metering element so that high pump pressures are ineffective to adversely affect the thermostat performance. Preferably the sealing element is formed of flexible polytetrafluoroethylene which is a tough, anti-freeze resistant material having good anti-friction and sealing properties.

FIG. 2 Construction

The FIG. 2 construction has many features in common with the FIG. 1 construction, and similar components are therefore designated by similar reference numerals.

The FIG. 2 form differs from the FIG. 1 form as regards the location of the return spring and the means for connecting the metering element with the power element piston. Thus, in the FIG. 2 device the spring 56' is disposed between the spider and metering element spokes in the area just inside the outer tubular portion 40. With such an arrangement a fairly large cross section flow path is provided inwardly of the coil convolutions.

As shown in FIG. 2, the metering element is connected with the power element piston by two arm portions 50' which are struck out of the material used to form the metering element spokes. The upper ends of the arm portions are apertured to fit over the outer ends of a channel shaped web element 54' which is suitably secured to the piston. In operation the FIG. 2 construction operates in much the same manner as the FIG. 1 form.

Features of the Invention

One noteworthy feature of the illustrated constructions relates to metering element 38, particularly its ability to be constructed as a low draft, low cost stamping of limited axial dimension. The small axial dimension is obtainable because the metering element is guided on the centrally disposed thermostatic power element instead of on the annular casing structure 22. Thus, the inner tubular portion 42 can be disposed in radial alignment with the outer tubular portion 40 to provide a low draft construction susceptible of formation as a low cost stamping.

A further feature in connection with metering element 38 resides from the fact that the seat-engaging portion 41 is automatically hardened during formation of the metering element. Thus, as the outer tubular portion 40 is formed from flat stock the annular wall portion 41 undergoes a hardening or coining process which is beneficial in resisting abrasion forces from fast flowing solid particles in the liquid stream being handled by the thermostat. In certain prior art thermostats the seat-engaging surface of the metering element was formed as a raw edge which was susceptible to having radial grooves worn therein by fast-moving abrasive particles in the liquid stream.

A further advantage in the illustrated metering element construction results from its slidable mounting at 42 such that very little lateral play of the metering element is possible. This is in contrast to certain prior art arrangements wherein the metering element was slidably guided in the annular casing structure corresponding to structure 22. In those arrangements considerable lateral clearance had to be maintained between the sliding and fixed parts so that considerable lateral vibrational movement of the metering element was possible. Such lateral movement is objectionable in that it results in considerable wear on the sealing element corresponding to element 58. In contrast, mounting of the metering element on the thermostatic power element structure results in very little lateral movement of the metering element and proportionately less wear on sealing element 58.

It will also be noted that with the illustrated construction both the metering element 38 and the seat element 36 are mounted in close proximity to one another on the same housing structure. With this arrangement the two elements are enabled to be in complete axial alignment with one another so as to form a complete seal in the closed position of the thermostat.

It will additionally be noted that in the partially opened or fully opened positions of the metering element there is provided a completely unobstructed annular fluid path around sealing ring 37. In contrast, certain prior art arrangements require the fixed seat element to be supported by struts or arms extending from the casing structure corresponding to structure 22. In such prior art arrangements these struts interfere to a certain extent with the liquid flow and cause undesired turbulence and fluid restriction.

A further advantage of the illustrated completely annular unobstructed arrangements is that they permit the utilization of a replaceable ring-type sealing element 37, whereas the struts in the aforementioned arrangements prevent the installation of such a sealing element construction.

In connection with the flow capacity of the thermostat, it will be noted that seat element 36 is located considerably below the annular casing structure 22 so that a fairly large annular space 43 is provided in passage 12 below the casing structure. Thus, the liquid has a fairly large cross sectional space in which to flow into the annular space between members 36 and 38. As further contributing toward a satisfactory flow capacity the coil spring 56 or 56' is located closely adjacent the outer surface of the thermostatic power element or adjacent the inner surface of metering element portion 40; in either position it has minimum tendency to interfere with the liquid flow. Thus, a considerable cross sectional area flow path is provided within the thermostat interior for the unrestrained flow of liquid into line 14.

As a final point, it will be noted that I have utilized support structure 18 and power element 26 as the means for mounting the two valve members 36 and 38. The conventional power element 26 is by its nature a high strength device because it must withstand the high internal forces developed within material 32 and plug 34; however to my knowledge the power element has not heretofore been fully utilized as a support for the valve elements. The present arrangement of power element and valve elements is thus believed to result in a relatively high strength, low cost assembly.

The aforementioned discussion has necessarily centered on concrete embodiments of the invention, but it will be appreciated that variations and modifications of the illustrated embodiments may be resorted to without departing from the spirit of the invention as set forth in the appended claims.

What is claimed:

1. A liquid line thermostat comprising a hollow casing structure; a thermostatic power element comprising a fixed housing structure disposed generally within the casing structure, and a piston slidably extending from the housing structure; a valve seat carried solely by the power element housing structure upstream from the casing structure; and a piston-operated tubular metering element slidably supported on the external surface of the power element housing structure for movement toward and away from the seat.

2. A liquid line thermostat comprising a hollow casing structure; a thermostatic power element comprising a housing structure fixedly disposed generally within the casing structure, and a piston slidably extending from the housing structure; a valve seat carried by the power element housing structure upstream from the casing structure; and a piston-operated tubular metering element slidably supported on the external surface of the power element housing structure for movement toward and away from the seat; said metering element comprising an outer tubular portion cooperable with the valve seat, and an inner tubular portion slidably-guidably engaging the housing structure external surface.

3. A thermostat for a liquid line comprising a support structure adapted to take a fixed position extending across the line; a thermostatic power element comprising a housing structure rigidly anchored on and extending axially from the support structure, and a piston slidably disposed within said housing structure; said housing structure comprising a tubular piston guide portion having its downstream end portion affixed directly to the support structure, and an expansion material container portion affixed to the guide portion; a valve seat carried by the housing structure upstream from the support structure for directing liquid into the thermostat; and a tubular metering element operably connected with the piston for movement toward and away from the seat whereby to regulate the liquid flow; said metering element comprising an outer tubular portion cooperable with the valve seat, and an inner tubular portion slidably-guidably engaging the external surface of the piston guide portion upstream from its point of connection with the support structure.

4. A thermostat for a liquid line comprising a hollow annular casing structure and a cooperating spider adapted to take a fixed position in the line; a thermostatic power element comprising a housing structure rigidly anchored in and extending axially from the spider in an upstream direction, and a piston slidably disposed within said housing structure; an immovable valve seat carried solely by the power element housing structure upstream from the hollow annular casing structure, whereby to cooperate therewith in defining a completely unobstructed annular opening for the flow of liquid into the casing structure interior; a tubular metering element slidably positioned within the casing structure for movement toward and away from the immovable seat whereby to regulate the flow of liquid through the aforementioned annular opening; and means connecting the metering element with the piston whereby movement of the piston is effective to operate the element.

5. A thermostat for a liquid line comprising a hollow annular casing structure and a cooperating spider adapted to take a fixed position in the line; a thermostatic power element comprising a housing structure rigidly anchored in and extendng axially from the spider in an upstream direction, and a piston slidably disposed within said housing structure in axially spaced relation to the annular by the power element housing structure in axially spaced relation to the annular casing structure, whereby to cooperate therewith in defining a completely unobstructed annular opening for the flow of liquid into the casing structure interior; a tubular metering element slidably positioned within the casing structure for movement toward and away from the immovable seat whereby to regulate the flow of liquid through the aforementioned annular opening; means connecting the metering element with the piston whereby movement of the piston is effective to operate the element; and an annular flexible sealing element mounted in the annular casing structure with the face area thereof engaging the external surface of the metering element so that upstream pressure is effective to increase the engagement force.

6. A thermostat for a liquid line comprising a hollow annular casing structure and a cooperating spider adapted to take a fixed position in the line; a thermostatic power element comprising a housing structure rigidly anchored in and extending axially from the spider, and a piston slidably disposed within said housing structure; an immovable valve seat carried solely by the power element housing structure in axially spaced relation to the annular casing structure, whereby to cooperate therewith in defining a completely unobstructed annular opening for the flow of liquid into the casing structure interior; a tubular metering element slidably positioned within the casing structure for movement toward and away from the immovable seat whereby to regulate the flow of liquid through the aforementioned annular opening; and means connecting the metering element with the piston whereby movement of the piston is effective to operate the element; said connecting means comprising a web portion operatively engaging the piston and arm portions extending from the web portion through the spider into operative connections with the metering element.

7. The combination of claim 6 wherein the arm portions are integral with the web portion.

8. The combination of claim 6 wherein the arm portions are integral with the metering element.

9. A thermostat for a liquid line comprising a support structure adapted to take a fixed position in the line; a thermostatic power element comprising a housing structure rigidly anchored in and extending axailly from the support structure, and a piston slidably disposed within said housing structure; an immovable valve seat affixed to a portion of the power element housing structure upstream from the support structure whereby to form an annular opening for the flow of liquid into the thermostat; and a tubular metering element operably connected with the piston for movement toward and away from the seat whereby to regulate the flow of liquid through the annular opening; said metering element comprising an outer tubular portion cooperable with the valve seat, an inner tubular portion slidably-guidably engaging the power element external surface, and spokes interconnecting the inner tubular portion with the end of the metering element closest to the valve seat.

References Cited by the Examiner
UNITED STATES PATENTS 2,754,062   7/56   Von Wangenheim ____ 236—34.5
3,057,556   10/62  Wagner _____ 236—34.5

EDWARD J. MICHAEL, *Primary Examiner.*

UNITED STATES PATENT OFFICE
CERTIFICATE OF CORRECTION

Patent No. 3,157,356                        November 17, 1964

Charles E. Karppinen

It is hereby certified that error appears in the above numbered patent requiring correction and that the said Letters Patent should read as corrected below.

Column 4, lines 70 and 71, strike out "in axially spaced relation to the annular by the power element housing structure", and insert instead --; an immovable valve seat carried solely by the power element housing structure --; column 6, line 8, for "axailly" read -- axially --.

Signed and sealed this 11th day of May 1965.

(SEAL)
Attest:

ERNEST W. SWIDER
Attesting Officer

EDWARD J. BRENNER
Commissioner of Patents